(12) United States Patent
Jeong (10) Patent No.: US 12,513,232 B2
(45) Date of Patent: Dec. 30, 2025

(54) MOBILE PHONE HOLDING UNIT

(71) Applicant: Jin Yeong Jeong, Seoul (KR)

(72) Inventor: Jin Yeong Jeong, Seoul (KR)

( * ) Notice: Subject to any disclaimer, the term of this patent is extended or adjusted under 35 U.S.C. 154(b) by 300 days.

(21) Appl. No.: 18/459,796

(22) Filed: Sep. 1, 2023

(65) Prior Publication Data

US 2024/0080384 A1 Mar. 7, 2024

(30) Foreign Application Priority Data

Sep. 6, 2022 (KR) .................. 10-2022-0112686

(51) Int. Cl.
*H04M 1/04* (2006.01)

(52) U.S. Cl.
CPC .................................... *H04M 1/04* (2013.01)

(58) Field of Classification Search
CPC ....................................................... H04M 1/04
See application file for complete search history.

(56) References Cited

U.S. PATENT DOCUMENTS

| | | | |
|---|---|---|---|
| 10,376,719 B1 * | 8/2019 | Xu .......................... | A62B 3/005 |
| 2016/0373152 A1 * | 12/2016 | Schmidt ................ | H04B 1/3888 |
| 2021/0389794 A1 * | 12/2021 | Nagy .................... | H04B 1/3888 |
| 2024/0097730 A1 * | 3/2024 | Cartwright ........... | H04B 1/3888 |

FOREIGN PATENT DOCUMENTS

| | | |
|---|---|---|
| KR | 20-2000-0010145 Y1 | 6/2000 |
| KR | 10-2021-0126526 A | 10/2021 |

* cited by examiner

*Primary Examiner* — George Eng
(74) *Attorney, Agent, or Firm* — NKL LAW; Jae Youn Kim (57) ABSTRACT

Disclosed is a mobile phone holding unit including a main body including side and bottom surfaces so that a mobile phone is received in the main body, and having accommodation recesses formed in the bottom surface and configured to receive magnetic bodies, the magnetic bodies formed as thin slices and respectively inserted into the accommodation recesses so as to be received therein, and protective covers pressed into upper surfaces of the accommodation recesses and configured to protect the upper surfaces of the magnetic bodies and to compensate for steps on the bottom surface caused by the accommodation recesses so as to keep the bottom surface level. The mobile phone holding unit enables a mobile phone having no magnets embedded therein to be simply attached thereto and detached therefrom using magnetic force, and is used to stably hold the mobile phone even in the back seat of a vehicle.

9 Claims, 7 Drawing Sheets

MOBILE PHONE HOLDING UNIT

BACKGROUND OF THE INVENTION

Field of the Invention

The present invention relates to a mobile phone holding unit, and more particularly, to a mobile phone holding unit which may enable a mobile phone having no magnets embedded therein to be simply attached to and detached from the mobile phone holding unit using magnetic force, and may be used to stably hold the mobile phone even in the back seat of a vehicle where it is not easy to install a mobile phone holder.

Description of the Related Art

Various mobile phone holders for vehicles configured to hold a mobile phone to a vehicle are being developed, a specific mobile phone model having magnetic members provided on the rear surface thereof has been released, and an exclusive mobile phone holder corresponding to this mobile phone model which holds a mobile phone using magnetic force has been developed and is being used.

However, such an exclusive mobile phone holder cannot hold mobile phone models having no magnetic members on the rear surfaces thereof using magnetic force, and therefore, a mobile phone holder which may hold a mobile phone using magnetic force regardless of the model of the mobile phone is required.

Further, the above-described conventional exclusive mobile phone holder for the specific mobile phone model has a problem that a corresponding mobile phone cannot be stably fixed at a designated position of the holder due to vibration of a vehicle.

In addition, the conventional mobile phone holders for vehicles are generally installed on a windshield or at the air vent of an air conditioner of a vehicle and are thus mainly used by a driver in the driver's seat and a passenger in the front seat of the vehicle, but have difficulty in being used by a passenger in the back seat.

RELATED ART DOCUMENTS

Patent Documents (Patent Document 1) Korean Utility Model Laid-open Publication No. 20-2000-0010145 (Publication Date: Jun. 15, 2000)

(Patent Document 2) Korean Patent Laid-open Publication No. 10-2021-0126526 (Publication Date: Oct. 20, 2021)

SUMMARY OF THE INVENTION

Therefore, the present invention has been made in view of the above problems, and it is an object of the present invention to provide a mobile phone holding unit which may hold various kinds of mobile phones using magnetic force regardless of models of the mobile phones.

It is another object of the present invention to provide a mobile phone holding unit which may be used to hold a mobile phone even by a passenger in the back seat of a vehicle where it is not easy to install a mobile phone holder.

It is yet another object of the present invention to provide a mobile phone holding unit which may execute various application programs even while holding a mobile phone.

In accordance with the present invention, the above and other objects can be accomplished by the provision of a mobile phone holding unit including a main body including side surfaces and a bottom surface so that a mobile phone is received in the main body, and having a plurality of accommodation recesses formed in the bottom surface and configured to receive magnetic bodies, the magnetic bodies formed in a form of thin slices and respectively inserted into the plurality of accommodation recesses so as to be received therein, and protective covers pressed into upper parts of the accommodation recesses and configured to protect the upper surfaces of the magnetic bodies and to compensate for steps on the bottom surface caused by the accommodation recesses so as to keep the bottom surface level.

The plurality of accommodation recesses may include four accommodation recesses spaced apart from one another at intervals of 90° on the same circumference.

The magnetic bodies may be received at least two accommodation recesses among the four accommodation recesses.

Each of the four accommodation recesses may include a central opening, a left opening, a right opening, an upper opening, and a lower opening formed in the same shape at central, left, right, upper and lower positions.

Each of the central opening, the left opening, the right opening, the upper opening, and the lower opening may be formed in a square shape.

Each of the magnetic bodies may be received in any one of the central opening, the left opening, the right opening, the upper opening, and the lower opening.

The central opening, the left opening, the right opening, the upper opening, and the lower opening may be formed to communicate with one another so that each of the magnetic bodies is slidably moved thereamong.

The protective covers may be formed in the same "+" shape as that of the accommodation recesses so as to be pressed into the accommodation recesses, a thickness of a part of each of the protective covers pressed into the central opening may correspond to a depth difference between an upper surface of a corresponding one of the magnetic bodies received in the central opening and an upper end of the central opening, a thickness of parts of each of the protective covers pressed into the left opening, the right opening, the upper opening, and the lower opening may be the same as a depth of the accommodation recesses, and each of the protective cover may protect the upper surface of the corresponding one of the magnetic bodies received in the central opening, and may prevent movement of the corresponding one of the magnetic bodies.

Otherwise, the protective covers may be formed in the same "+" shape as that of the accommodation recesses so as to be pressed into the accommodation recesses, a thickness of a part of each of the protective covers pressed into any one of the left opening, the right opening, the upper opening, and the lower opening may correspond to a depth difference between an upper surface of a corresponding one of the magnetic bodies received in the one of the left opening, the right opening, the upper opening, and the lower opening, and the upper end of a corresponding one of the accommodation recesses, a thickness of parts of each of the protective covers pressed into the central opening and remainders of the left opening, the right opening, the upper opening, and the lower opening, into which the corresponding one of the magnetic bodies is not received, may be the same as a depth of the accommodation recesses, and each of the protective cover may protect the upper surface of the corresponding one of the magnetic bodies received in the central opening, and may prevent movement of the corresponding one of the magnetic bodies.

The mobile phone holding unit may further include a holder configured such that an outer side of the bottom surface of the mobile phone cover is attached thereto by magnetic force.

The holder may include a holding part configured such that thin metal slices are laid therein on the same circumference corresponding to the accommodation recesses so as to attach the outer side of the bottom surface of the mobile phone cover to the holding part by magnetic force, and a fixing part provided on a rear surface of the holding part and configured to couple the holding part to an inner structure of a vehicle so as to fix the holding part.

The holding part may include a wireless charging module configured to induce magnetic field change so as to wirelessly charge the mobile phone received in the mobile phone cover attached to the holding part.

An NFC chip having a unique identifier embedded therein and configured to execute a predetermined application program by a recognized NFC chip identifier of the mobile phone may be installed in the holding part.

The application program executed by identification through the NFC chip may be a navigation application.

The holding part may include repulsive magnetic bodies laid between the thin metal slices on the circumference on which the thin metal slices are laid, and configured to have the same polarity as the magnetic bodies of the mobile phone cover so as to generate repulsive force when the magnetic bodies approach the repulsive magnetic bodies.

The mobile phone holding unit may further include a fixing bracket dented to a designated depth at a position of an assist grip on a rear surface of a front seat of a vehicle so as to fix the holder, and the fixing bracket may include a rectangular plate dented at the position of the assist grip so as to be fixed, a fixing unit configured to fix the plate to the position of the assist grip, fixing holes configured to fix the holder, and an interface terminal configured to supply power to the mobile phone.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter reference will be made in detail to various embodiments of the present invention, examples of which are illustrated in the accompanying drawings and described in detail below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. In the following description of the present invention, a detailed description of known functions and configurations incorporated herein will be omitted when it may make the subject matter of the present invention rather unclear.

In the following description of the embodiments, terms, such as "first" and "second", may be used to describe various elements but do not limit the elements. These terms are used only to distinguish one element from other elements.

The terminology used herein is for the purpose of describing particular example embodiments only and is not intended to be limiting. Singular expressions may encompass plural expressions, unless they have clearly different contextual meanings. In the following description of the embodiments, terms, such as "including", "comprising" and "having", are to be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same.

The present invention relates to a mobile phone holding unit which may enable even a mobile phone having no magnets embedded therein to be simply attached to and detached from the mobile phone holding unit using magnetic force, and may be used to stably hold the mobile phone even in the back seat of a vehicle where it is not easy to install a mobile phone holder.

Figure 1:
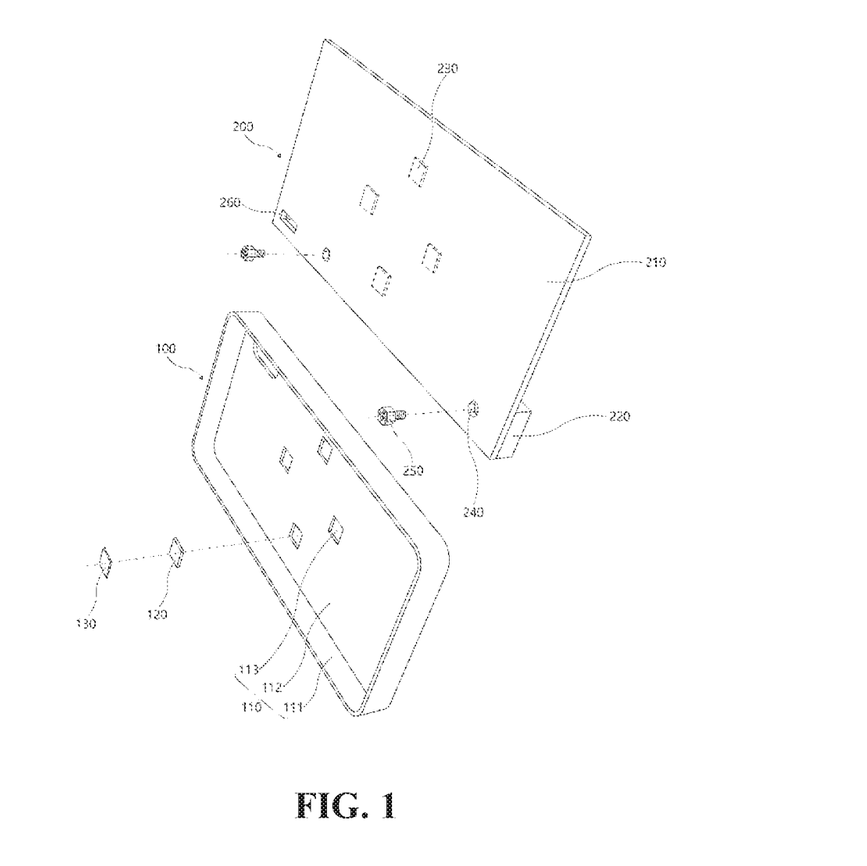
FIG. 1 is a perspective view of a mobile phone holding unit according to the present invention.

Hereinafter, the mobile phone holding unit according to the present invention will be described in more detail with reference to the exemplary embodiments and the accompanying drawings. FIG. 1 is a perspective view of the mobile phone holding unit according to the present invention, and FIG. 2 is a cross-sectional view showing a state in which a magnetic body is received in a mobile phone cover which is one element of the mobile phone holding unit.

Figure 2:
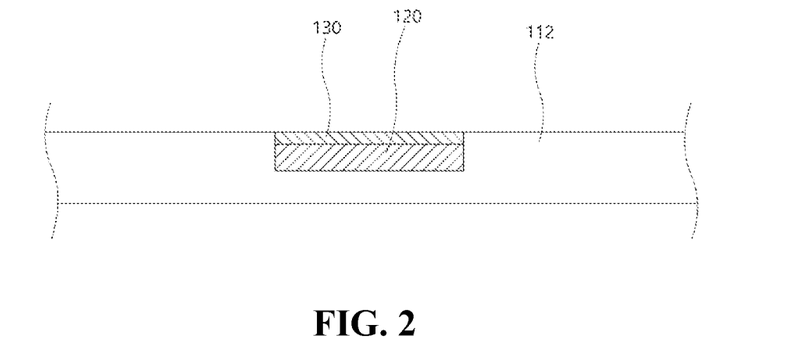
FIG. 2 is a cross-sectional view showing a state in which a magnetic body is received in a mobile phone cover included in the mobile phone holding unit according to the present invention.

First, referring to FIGS. 1 and 2, the mobile phone holding unit according to the present invention may include a mobile phone cover 100 configured to receive a mobile phone and to have a rear surface attached to a holder 200 by magnetic force, and the holder 200 configured to hold the mobile phone cover 100 so as to fix the mobile phone cover 100 to the inside of a vehicle.

In the present invention, the mobile phone cover 100 may include a main body 110, magnetic bodies 120, and protective covers 130.

The main body 110 includes side surfaces 111 and a bottom surface 112, and receives the mobile phone in a space formed in the main body 110 to protect the mobile phone, and a plurality of accommodation recesses 113 configured to receive the magnetic bodies 120 is formed in the bottom surface 112.

The magnetic bodies 120 are formed in the form of thin slices, and are inserted into the plurality of accommodation recesses 113 so as to attach the main body 110 to the holder 200 using magnetic force.

Further, the protective covers 130 are pressed into the upper parts of the accommodation recesses 113, protect the upper surfaces of the magnetic bodies 120, and compensate for steps on the bottom surface 112 caused by the accommodation recesses 113 so as to keep the bottom surface 112 level.

According to the present invention, by inserting the magnetic bodies 120 into the mobile phone cover 100 and disposing a magnetic material corresponding to the magnetic bodies 120 in the holder 200, a mobile phone having no magnetic bodies installed therein may be simply held in the holder 200 using magnetic force regardless of a mobile phone model.

Here, the plurality of accommodation recesses 113 may include four accommodation recesses 113 spaced apart from one another at intervals of 90° on the same circumference. Therefore, the plurality of accommodation recesses 113 is respectively located at the vertices of a square, as shown in FIG. 1 or 3.

In the case of a conventional specific mobile phone model, a magnetic body is embedded in a circular shape in the mobile phone, and thus, whenever the mobile phone is attached to a holder, the mobile phone should be balanced horizontally and vertically, and thus causes inconvenience in use.

However, according to the present invention, because the magnetic bodies 120 are disposed in a square shape, when the mobile phone cover 100, in which a mobile phone is received, is held on the holder 200 in the horizontal or vertical direction once in the state in which the mobile phone is balanced with the holder 200, the mobile phone remains horizontally and vertically balanced, and thus, the holding direction of the mobile phone may be freely changed in the horizontal or vertical direction.

Figure 3:
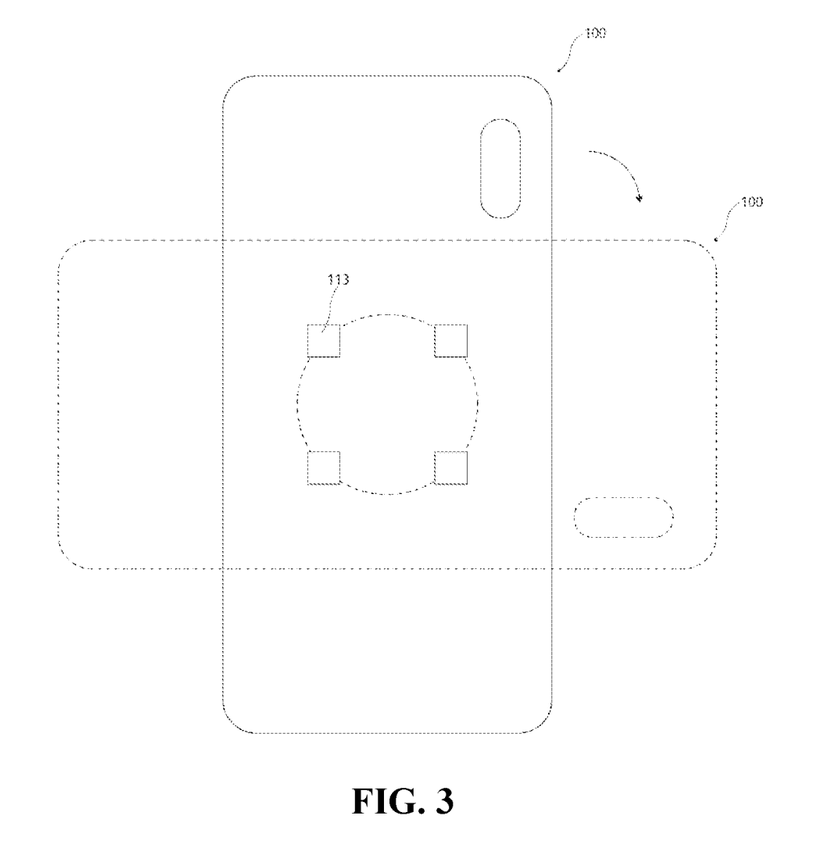
FIG. 3 is a view illustrating a state in which a mobile phone is held in a holder.

That is, as shown in FIG. 3, in the case that the mobile phone is initially held on the holder 200 in the vertical direction, when the mobile phone is rotated 90°, the mobile phone may be simply held on the holder 200 in the horizontal direction, i.e., the direction of the mobile phone may be simply changed.

Here, the diameter of a circle having the circumference on which the magnetic bodies 120 are located may be a diameter corresponding to a MagSafe magnet so as to use the MagSafe function of a conventional specific mobile phone model.

In the present invention, the magnetic bodies 120 may be received in at least two accommodation recesses 113 among the four accommodation recesses 113. That is, in order to minimize effects on various sensors installed in the mobile phone, the number of the used magnetic bodies 120 may be properly adjusted.

In recent, various-sized mobile phones are being released depending on a mobile phone model, and various kinds of sensors embedded at various positions in mobile phones are being developed. Accordingly, in line with this trend, it is necessary to variously change the positions of the magnetic bodies 120.

Figure 4:
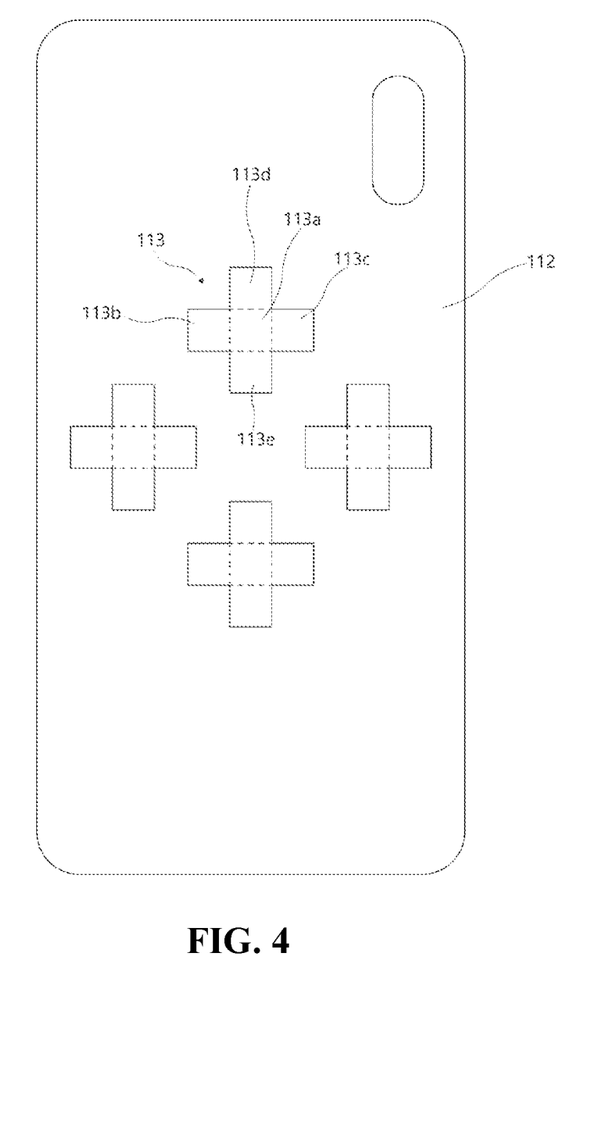
FIG. 4 is a plan view of the mobile phone cover according to one embodiment of the present invention.

In this connection, FIG. 4 is a plan view of the mobile phone cover 100 having the accommodation recesses 113 formed therein according to one embodiment of the present invention.

Referring to FIG. 4, each of the four accommodation recesses 113 may include a central opening 113a, a left opening 113b, a right opening 113c, an upper opening 113d, and a lower opening 113e formed in the same shape at central, left, right, upper and lower positions.

Here, each of the central opening 113a, the left opening 113b, the right opening 113c, the upper opening 113d, and the lower opening 113e may be formed in a square shape, respectively. Here, the central opening 113a, the left opening 113b, the right opening 113c, the upper opening 113d, and the lower opening 113e may be formed to communicate with one another.

Therefore, after the magnetic body 120 is received in any one of the central opening 113a, the left opening 113b, the right opening 113c, the upper opening 113d, and the lower opening 113e, the position of the magnetic body 120 may be easily changed to another opening in a sliding manner.

Thereby, according to the present invention, the positions of the magnetic bodies 120 may be variously changed depending on the model and size of the mobile phone, and thus, the mobile phone may be stably attached to the holder 200 by magnetic force while minimizing effects of magnetic force lines on the function of the mobile phone.

The magnetic bodies 120 inserted into the accommodation recesses 113 may be separated from the accommodation recesses 113 or the positions of the magnetic bodies 120 may be changed due to unwanted movement in use.

Figure 5A:
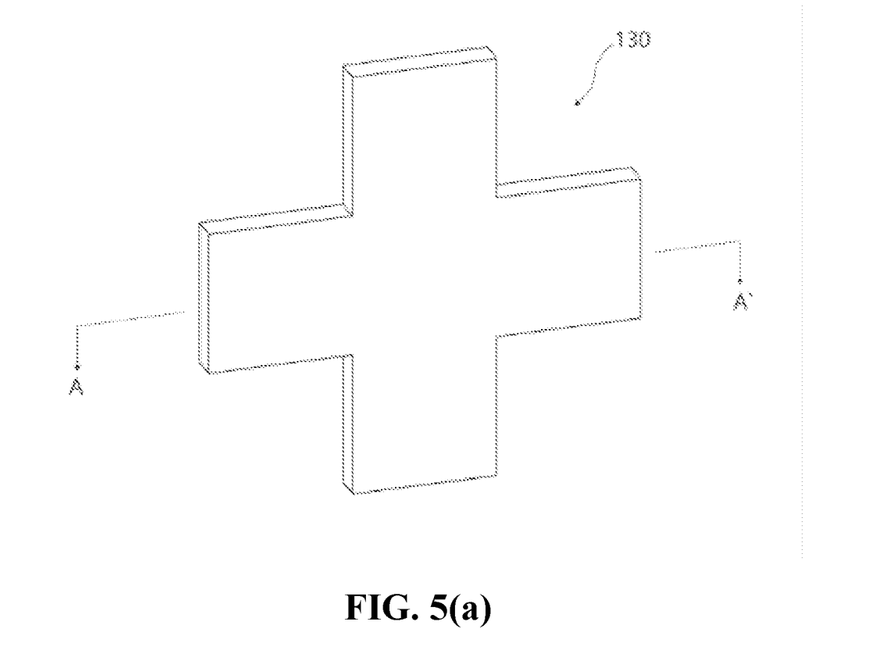
FIGS. 5(a) and 5(b) are perspective and cross-sectional views of a protective cover according to one embodiment of the present invention.
Figure 5B:
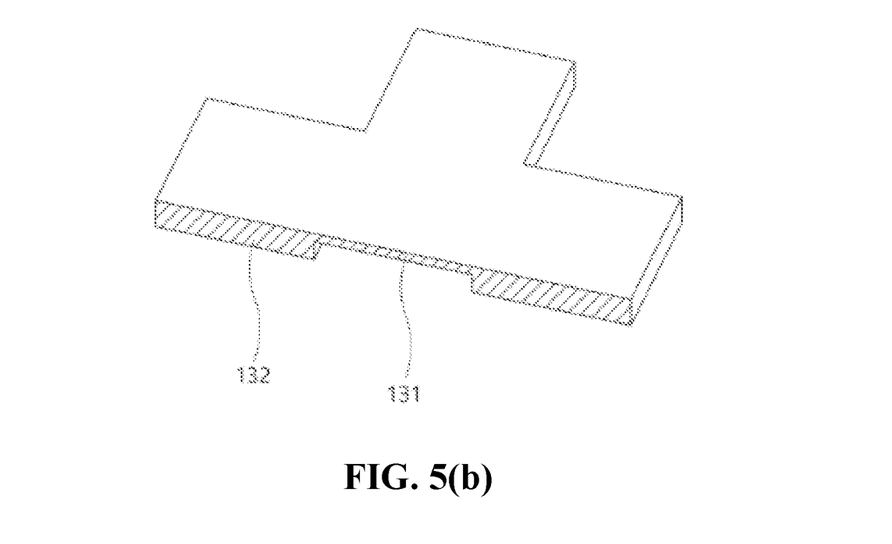

In this connection, FIGS. 5(a) and 5(b) are perspective and cross-sectional views of a protective cover 130 according to one embodiment of the present invention.

Referring to FIGS. 5(a) and 5(b), the protective covers 130 according to this embodiment may be formed in a "+" shape, which is the same as that of the accommodation recesses 113, so as to be pressed into the accommodation recesses 113. Here, the thickness 131 of a part of the protective cover 130 pressed into the central opening 113a may correspond to a depth difference between the upper surface of the magnetic body 120 received in the central opening 113a and the upper end of the central opening 113a. Further, the thickness 132 of parts of the protective cover 130 pressed into the left opening 113b, the right opening 113c, the upper opening 113d, and the lower opening 113e may be the same as the depth of the accommodation recess 113.

Thereby, the protective cover 130 according to this embodiment may protect the upper surface of the magnetic body 120 received in the central opening 113a, may prevent movement of the magnetic body 120, and may compensate for a step on the bottom surface 112 caused by the accommodation recess 113 so as to keep the bottom surface 112 level.

Figure 6A:
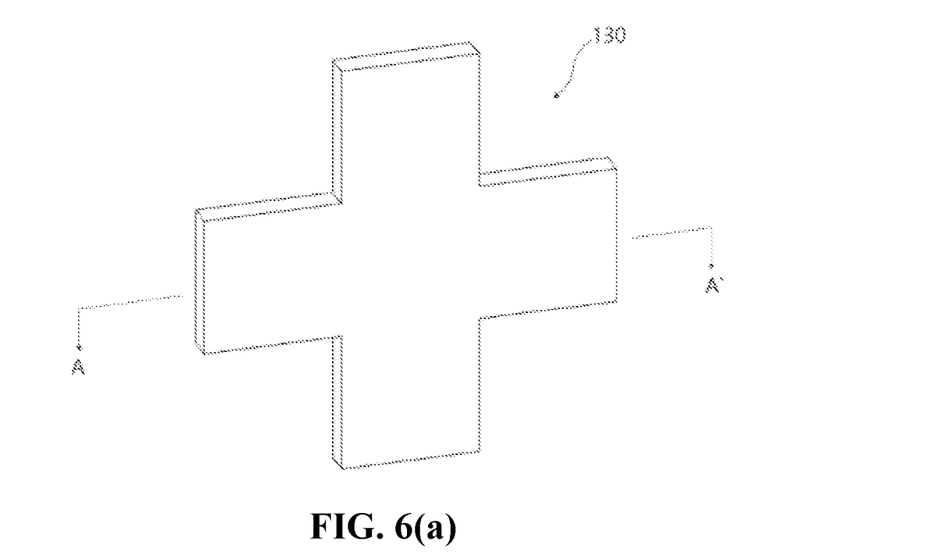
FIGS. 6(a) and 6(b) are perspective and cross-sectional views of a protective cover according to another embodiment of the present invention.
Figure 6B:
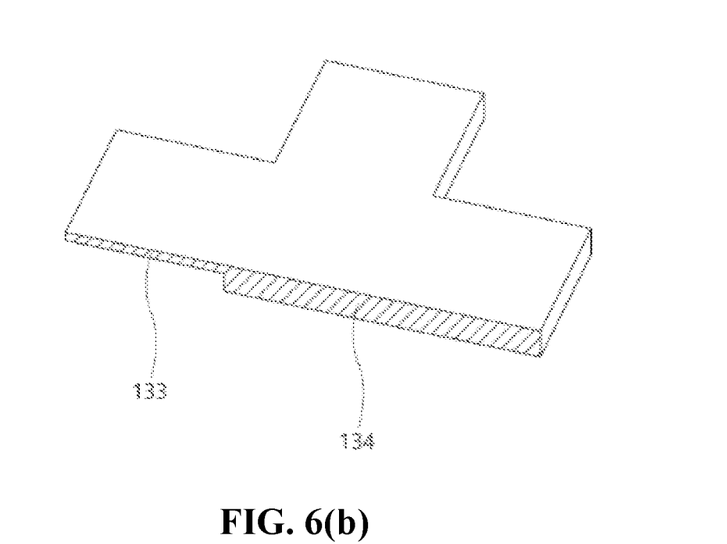

Further, FIGS. 6(a) and 6(b) are perspective and cross-sectional views of a protective cover 130 according to another embodiment of the present invention.

Referring to FIGS. 6(a) and 6(b), the protective covers 130 according to this embodiment may be formed in a "+" shape, which is the same as that of the accommodation recesses 113, so as to be pressed into the accommodation recesses 113. Here, the thickness 133 of a part of the protective cover 130 pressed into any one of the left opening 113b, the right opening 113c, the upper opening 113d, and the lower opening 113e may correspond to a depth difference between the upper surface of the magnetic body 120 received in the one of the left opening 113b, the right opening 113c, the upper opening 113d, and the lower opening 113e, and the upper end of the accommodation recess 113. Further, the thickness 134 of parts of the protective cover 130 pressed into the central opening 113a and the remainders of the left opening 113b, the right opening 113c, the upper opening 113d, and the lower opening 113e, into which the magnetic body 120 is not received, may be the same as the depth of the accommodation recess 113.

Thereby, the protective cover 130 according to this embodiment may protect the upper surface of the magnetic body 120 received in any one of the left opening 113b, the right opening 113c, the upper opening 113d, and the lower opening 113e, may prevent movement of the magnetic body 120, and may compensate for a step on the bottom surface 112 caused by the accommodation recess 113 so as to keep the bottom surface 112 level.

In the present invention, the holder 200, on which the mobile phone is held by magnetic force, may include a holding part 210 configured such that the outer side of the bottom surface 112 of the mobile phone cover 100 is attached thereto by magnetic force, and a fixing part 220 provided on the rear surface of the holding part 210 and configured to couple the holding part 210 to an inner structure of the vehicle so as to fix the holding part 210.

Here, thin metal slices 230 are laid in the holding part 210 at positions corresponding to the accommodation recesses 113 of the mobile phone cover 100, and thereby, the outer side of the bottom surface 112 of the mobile phone cover 100 is attached to the holding part 210 by magnetic force.

Further, the holding part 210 may include a wireless charging module (not shown) configured to induce magnetic field change so as to wirelessly charge the mobile phone attached to the holding part 210. Thereby, according to the present invention, the battery of the mobile phone may be charged while the mobile phone is held on the holding part 210.

The wireless charging module may include a coil part formed by vertically stacking and arranging coils and magnetic material sheets and configured to induce magnetic field change of the battery of the mobile phone attached to the holding part 210, without being limited thereto, but other types of wireless charging modules may be used.

In the present invention, a near field communication (NFC) chip (not shown) having a unique identifier embedded therein and configured to execute a predetermined application program by a recognized NFC chip identifier of the mobile phone may be installed in the holding part 210. Here, the application program executed by the above NFC chip identification may be, for example, a navigation application or a music application.

Thereby, the mobile phone holding unit according to the present invention has an effect of executing various application programs while the mobile phone is held in the mobile phone holding unit.

The mobile phone attached to the holding part 210 by magnetic force may deviate from the original position thereof due to vibration caused by driving of the vehicle and, in this case, when the mobile phone is moved out of a range in which the magnetic force lines are effective, the mobile phone may be detached from the holder 200.

In order to prevent such a problem, the present invention is characterized in that repulsive magnetic bodies (not shown) configured to generate repulsive force so as to return the mobile phone to the original position thereof, when the mobile phone deviates from the original position thereof, are installed in the holding part 210.

For this purpose, the repulsive magnetic bodies have the same polarity as the magnetic bodies 120 of the mobile phone cover 100, and are laid between the thin metal slices 230 of the holding part 210 on the circumference on which the thin metal slices 230 are laid.

Thereby, when the mobile phone is moved and the magnetic bodies 120 laid in the mobile phone cover 100 approach the repulsive magnetic bodies, repulsive force occurs between the magnetic bodies 120 of the mobile phone cover 100 and the repulsive magnetic bodies, and may thus return the mobile phone to the original position thereof.

Accordingly, in the present invention, the attachment position of the mobile phone cover 100 to the holding part 210 after attachment of the mobile phone cover 100 to the holding part 210 may be stably fixed, and the mobile phone cover 100 may be accurately attached to a horizontal position or a vertical position when attaching the mobile phone cover 100 to the holding part 210.

Figure 7:
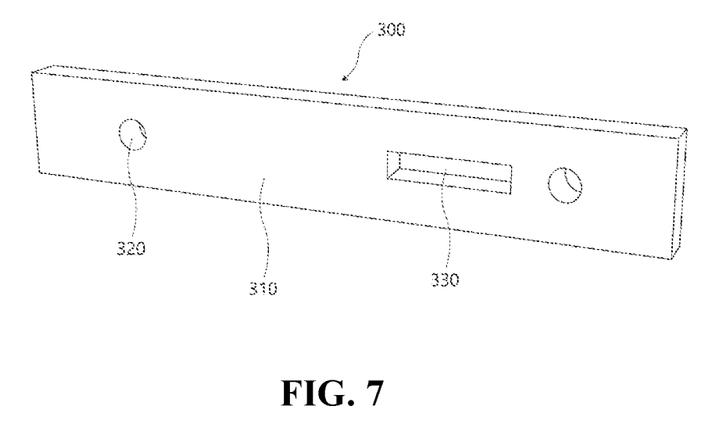
FIG. 7 is a perspective view of a fixing bracket included in the mobile phone holding unit according to the present invention.

In the present invention, the holder 200 may be dented to a designated depth at the position of an assist grip on the rear surface of a front seat of the vehicle by a fixing bracket 300 so as to be fixed.

For this purpose, the fixing bracket 300 may include a rectangular plate 310 dented at the position of the assist grip so as to be fixed, a fixing unit (not shown) configured to fix the plate 310 to the position of the assist grip, and fixing holes 320 configured to fix the holder 200.

The fixing holes 320 may be formed to communicate with through holes 240 formed through the holder 200, the holder 200 may be fixed to the plate 310 by inserting bolts 250 or the like into the fixing holes 320 and the through holes 240.

Thereby, according to the present invention, a handle is removed from the rear surface of the front seat of the vehicle, and the holder 200 is fixedly installed at the same position, thereby exhibiting an effect of holding a mobile phone even in the back seat of the vehicle where it is not easy to hold the mobile phone.

Further, an interface terminal 330 configured to supply power to the mobile phone may be provided in the plate 310, and a fixture (not shown) configured to fix a hanger or a rack may be installed on the plate 310 so as to be used for various purposes.

Here, the interface terminal 330 may be, for example, a USB terminal, and may be installed adjacent to one fixing hole 320 between the two fixing holes 320.

As is apparent from the above description, in a mobile phone holding unit according to the present invention, magnetic bodies are inserted into a mobile phone cover, and a magnetic material corresponding to the magnetic bodies is disposed in a holder, thereby being capable of enabling a mobile phone having no magnetic bodies installed therein to be simply held on the holder by magnetic force regardless of the model of the mobile phone.

Further, in the mobile phone holding unit according to the present invention, a handle is removed from the rear surface of a front seat of the vehicle, and the holder is fixedly installed at the same position, thereby being capable of exhibiting an effect of holding a mobile phone in the back seat of the vehicle where it is not easy to hold the mobile phone.

Particularly, in the mobile phone holding unit according to the present invention, a magnetic body having the same polarity as the magnetic bodies installed in the mobile phone cover is installed between magnetic material sections installed in the holder, and thereby, even when the position of the mobile phone held on the holder is changed due to vibration of the vehicle, repulsive force occurs between the magnetic bodies of the mobile phone cover and the magnetic body of the holder, and thus returns the mobile phone to the original position thereof, thereby being capable of stably fixing the mobile phone to a designated position.

In addition, in the mobile phone holding unit according to the present invention, an NFC chip is installed in the holder, thereby being capable of executing various application programs even while holding the mobile phone.

Although the exemplary embodiments of the present invention have been disclosed for illustrative purposes, those skilled in the art will appreciate that various modifications and changes thereof, such as additions, changes, deletions and substitutions of elements, are possible, without departing from the scope and spirit of the invention as disclosed in the accompanying claims.

For example, the respective elements described as single elements may be implemented as a distributed manner, and the elements described as being implemented in the distributed manner may be implemented as a combined type. The scope of the present invention is defined not by the detailed description, but by the claims and their equivalents, and all variations within the scope of the claims and their equivalents are to be construed as being included in the present disclosure.

The present invention relates to a mobile phone holding unit which may enable a mobile phone having no magnets embedded therein to be simply attached to and detached from the mobile phone holding unit using magnetic force, and may be used to stably hold the mobile phone even in the back seat of a vehicle where it is not easy to install a mobile phone holder.

What is claimed is:

1. A mobile phone holding unit comprising:
   a main body comprising side surfaces and a bottom surface so that a mobile phone is received in the main body, and having a plurality of accommodation recesses formed in the bottom surface and configured to receive magnetic bodies;
   the magnetic bodies formed in a form of thin slices and respectively inserted into the plurality of accommodation recesses so as to be received therein; and
   protective covers pressed into upper parts of the accommodation recesses and configured to protect the upper surfaces of the magnetic bodies and to compensate for steps on the bottom surface caused by the accommodation recesses so as to keep the bottom surface level,
   wherein the plurality of accommodation recesses comprises four accommodation recesses spaced apart from one another at intervals of 90° on the same circumference,
   wherein the magnetic bodies are received at least two accommodation recesses among the four accommodation recesses,
   wherein each of the four accommodation recesses comprises a central opening, a left opening, a right opening, an upper opening, and a lower opening formed in the same shape at central, left, right, upper and lower positions,
   wherein each of the central opening, the left opening, the right opening, the upper opening, and the lower opening is formed in a square shape,
   wherein each of the magnetic bodies is received in any one of the central opening, the left opening, the right opening, the upper opening, and the lower opening, and
   wherein the central opening, the left opening, the right opening, the upper opening, and the lower opening are formed to communicate with one another so that each of the magnetic bodies is slidably moved thereamong.

2. The mobile phone holding unit according to claim 1, wherein:
   the protective covers are formed in the same "+" shape as that of the accommodation recesses so as to be pressed into the accommodation recesses;
   a thickness of a part of each of the protective covers pressed into the central opening corresponds to a depth difference between an upper surface of a corresponding one of the magnetic bodies received in the central opening and an upper end of the central opening;
   a thickness of parts of each of the protective covers pressed into the left opening, the right opening, the upper opening, and the lower opening is the same as a depth of the accommodation recesses; and
   each of the protective cover protects the upper surface of the corresponding one of the magnetic bodies received in the central opening, and prevents movement of the corresponding one of the magnetic bodies.

3. The mobile phone holding unit according to claim 1, wherein:
   the protective covers are formed in the same "+" shape as that of the accommodation recesses so as to be pressed into the accommodation recesses;
   a thickness of a part of each of the protective covers pressed into any one of the left opening, the right opening, the upper opening, and the lower opening corresponds to a depth difference between an upper surface of a corresponding one of the magnetic bodies received in the one of the left opening, the right opening, the upper opening, and the lower opening, and the upper end of a corresponding one of the accommodation recesses;
   a thickness of parts of each of the protective covers pressed into the central opening and remainders of the left opening, the right opening, the upper opening, and the lower opening, into which the corresponding one of the magnetic bodies is not received, is the same as a depth of the accommodation recesses; and
   each of the protective cover protects the upper surface of the corresponding one of the magnetic bodies received in the central opening, and prevents movement of the corresponding one of the magnetic bodies.

4. The mobile phone holding unit according to claim 1, further comprising a holder configured such that an outer side of the bottom surface of the mobile phone cover is attached thereto by magnetic force.

5. The mobile phone holding unit according to claim 4, wherein the holder comprises:
   a holding part configured such that thin metal slices are laid therein on the same circumference corresponding to the accommodation recesses so as to attach the outer side of the bottom surface of the mobile phone cover to the holding part by magnetic force; and
   a fixing part provided on a rear surface of the holding part and configured to couple the holding part to an inner structure of a vehicle so as to fix the holding part.

6. The mobile phone holding unit according to claim 5, wherein the holding part comprises a wireless charging module configured to induce magnetic field change so as to wirelessly charge the mobile phone received in the mobile phone cover attached to the holding part.

7. The mobile phone holding unit according to claim 6, wherein an NFC chip having a unique identifier embedded therein and configured to execute a predetermined application program by a recognized NFC chip identifier of the mobile phone is installed in the holding part.

8. The mobile phone holding unit according to claim 7, wherein the application program executed by identification through the NFC chip is a navigation application.

9. The mobile phone holding unit according to claim 1, further comprising a fixing bracket dented to a designated depth at a position of an assist grip on a rear surface of a front seat of a vehicle so as to fix the holder,
   wherein the fixing bracket comprises:
   a rectangular plate dented at the position of the assist grip so as to be fixed;
   a fixing unit configured to fix the plate to the position of the assist grip;
   fixing holes configured to fix the holder; and
   an interface terminal configured to supply power to the mobile phone.

\* \* \* \* \*